H. E. DIETERLE.
Shuttle Actuating Mechanism for Sewing-Machines.
No. 218,811. Patented Aug. 26, 1879.
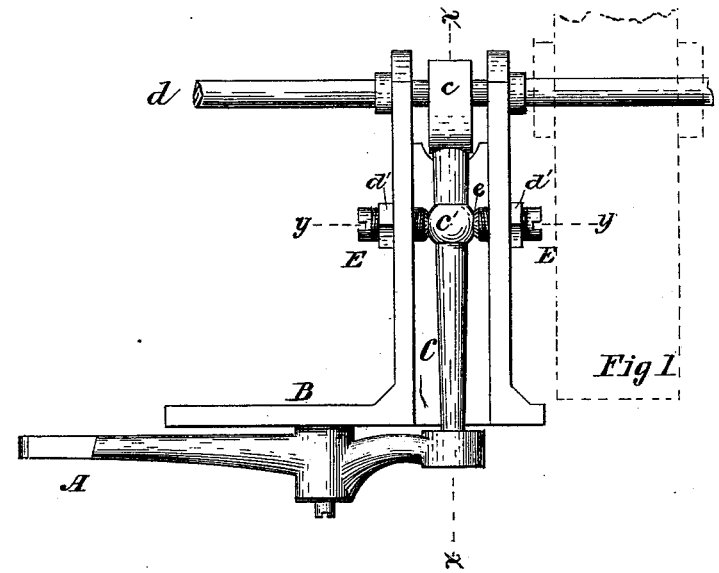
Fig 1.
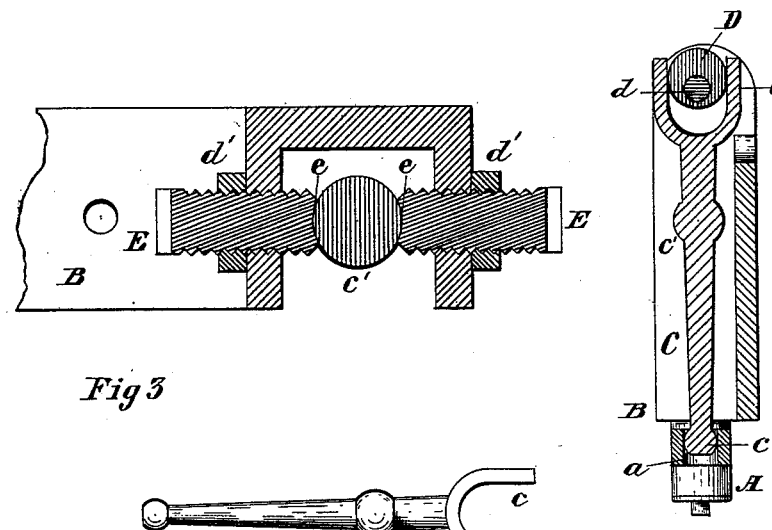
Fig 3.
Fig 2.
Fig 4.
Witnesses
W. C. Corliss
Jno. C. MacGregor
Inventor
Henry E Dieterle
By Coburn & Thacher
Attorneys

UNITED STATES PATENT OFFICE.

HENRY E. DIETERLE, OF CHICAGO, ILLINOIS, ASSIGNOR OF ONE-HALF HIS RIGHT TO GUSTAV BANDELOW, OF SAME PLACE.

IMPROVEMENT IN SHUTTLE-ACTUATING MECHANISMS FOR SEWING-MACHINES.

Specification forming part of Letters Patent No. 218,811, dated August 26, 1879; application filed April 10, 1879.

*To all whom it may concern:*

Be it known that I, HENRY E. DIETERLE, of Chicago, in the county of Cook and State of Illinois, have invented a new and useful Improvement in the Shuttle-Actuating Mechanism for Sewing-Machines, which is fully described in the following specification, reference being had to the accompanying drawings, in which—

Figure 1 represents an elevation of my improvement; Fig. 2, a section of the same, taken on the line $xx$, Fig. 1; Fig. 3, a transverse section, on an enlarged scale, taken on the line $y\,y$, Fig. 1; and Fig. 4, a detail view of the actuating-lever detached.

My invention relates to that class of sewing-machines in which a shuttle is used; and the object thereof is to improve the devices by means of which the shuttle is thrown.

The invention consists in the peculiar construction of the actuating-lever which vibrates the shuttle-lever, and the method of mounting it, all of which will be hereinafter more fully described, and pointed out definitely in the claims.

I have shown only so much of a machine as is necessary to illustrate my invention, and shall only describe the same with such allusions to other parts of the machine as will be readily understood.

In the drawings, A represents the shuttle-lever, which is attached to a support, B, and is usually arranged to vibrate horizontally. This lever is vibrated by an actuating-lever, C, which is mounted in the frame in an upright position.

The lever C has heretofore been mounted in the frame by a pivoted support, which gave it a fixed position, or, in other words, would permit it to vibrate in only one plane, and for this reason there has been more or less stiffness in the working of the devices for reciprocating the shuttle, owing to the peculiar nature of the attachment and movement required.

The lower end of the lever C is connected to the short arm of the shuttle-lever A, and the upper end is usually provided with a fork, $c$, within which a cam, D, on the driving-shaft $d$ is arranged to rotate, thereby vibrating the lever C, and giving a corresponding movement to the shuttle-lever.

Now, it is evident that the connection between the shuttle-lever and the lever C must be loose, as the connecting ends of these levers move in different arcs. When the lever C is mounted on a fixed pivot, this joint at the lower end has been made by forking the end of one lever and arranging the end of the other within the fork, which occasions friction, and is not in other respects satisfactory in its working. The fork on the upper end of the lever C, within which the cam works, should also be free to follow the cam perfectly, so as to prevent friction by any binding between these two parts. I therefore support the lever C by a joint which permits it to turn and vibrate in any direction, so as to follow instantly any change necessary in the position of the lever. This is accomplished by providing the lever with a ball or globe, $c^1$, at the point desired for the support thereof.

Two pins, E, are threaded, so as to be inserted in proper seats in the supporting-frame, and are made with concave recesses $e$ at their inner ends, corresponding to the convexity of the ball $c^1$. The lever C is arranged in the frame so that the ball $c^1$ will be embraced and held between the pins E, as shown in Fig. 3 of the drawings, the latter being turned up against the ball and provided with jam-nuts $d'$, to fasten them in position.

Now, it is evident that this joint will permit the lever C to be turned with the slightest force in any direction, and to vibrate in any path, regular or irregular, so that the fork on the upper end will always follow the driving-cam, the lever C finding its center and changing its center, according to circumstances.

This construction permits me to use a different joint at the lower end of the actuating-lever, which is provided with a ball, $c^2$, and in the end of the shuttle-lever a circular socket, $a$, is provided, adapted to just receive the ball $c^2$. This socket or seat $a$ is made by simply drilling a round hole through the end of the lever, and the joint thus formed will accommodate the changing relative positions of the connecting ends of the two levers, in connection with the free movement of the lever C on its center of motion.

My improvement gives great ease in the working of the shuttle mechanism, as it prevents friction, and also saves wear, so that it is economical, as well as easily worked.

The improvement is not limited to the cam device for vibrating the actuating-lever, as it is equally applicable to any other device adapted to produce this movement.

Having thus described my invention, what I claim as new, and desire to secure by Letters Patent, is—

1. The lever C, provided with a ball, $c^1$, in combination with the pivotal pins E, having concavities $e$ at their inner ends, between which the ball is held, substantially as and for the purpose set forth.

2. The actuating-lever C, provided with the two balls $c^1 c^2$, in combination with the pins E, having concave ends $e$, and the shuttle-lever A, provided with a circular aperture, $a$, adapted to receive the ball $c^2$, substantially as and for the purpose set forth.

3. The shuttle-lever A, provided with a round hole, $a$, in its outer end, in combination with the actuating-lever C, provided with the balls $c^1 c^2$ and fork $c$, the supporting-pins E, having concave ends $e$, and the cam D, arranged to revolve within the fork $c$ of the actuating-lever, substantially as described.

HENRY E. DIETERLE.

Witnesses:
  JNO. C. MACGREGOR,
  W. C. CORLIES.